(12) United States Patent
Miao et al.

(10) Patent No.: US 10,048,749 B2
(45) Date of Patent: Aug. 14, 2018

(54) GAZE DETECTION OFFSET FOR GAZE TRACKING MODELS

(71) Applicant: Microsoft Technology Licensing, LLC, Redmond, WA (US)

(72) Inventors: Xu Miao, Seattle, WA (US); Michael J. Conrad, Monroe, WA (US); Dijia Wu, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 461 days.

(21) Appl. No.: 14/594,028

(22) Filed: Jan. 9, 2015

(65) Prior Publication Data
US 2016/0202757 A1 Jul. 14, 2016

(51) Int. Cl.
*G06F 3/01* (2006.01)
*G06K 9/00* (2006.01)
(Continued)

(52) U.S. Cl.
CPC ........... *G06F 3/013* (2013.01); *G06K 9/0061* (2013.01); *G06K 9/00604* (2013.01);
(Continued)

(58) Field of Classification Search
None
See application file for complete search history.

(56) References Cited

U.S. PATENT DOCUMENTS 6,353,814 B1 3/2002 Weng
6,393,136 B1 5/2002 Amir et al.
(Continued)

FOREIGN PATENT DOCUMENTS

CN 101833646 A 9/2010
CN 102902967 A 1/2013
(Continued)

OTHER PUBLICATIONS

Zhu, J. et al., "Subpixel Eye Gaze Tracking," Proceedings of the Fifth IEEE International Conference on Automatic Face and Gesture Recognition (FGR'02), May 20, 2002, Washington, D.C., 6 pages.*
(Continued)

*Primary Examiner* — Edemio Navas, Jr.
(74) *Attorney, Agent, or Firm* — Alleman Hall Creasman & Tuttle LLP

(57) ABSTRACT

Examples are disclosed herein that relate to gaze tracking. One example provides a computing device including an eye-tracking system including an image sensor, a logic device, and a storage device comprising instructions executable by the logic device to track an eye gaze direction by acquiring an image of the eye via the eye-tracking system, and determining a determined location of a center of a lens of the eye from the image of the eye. The instructions are further executable to adjust the determined location of the center of the lens on a sub-pixel scale by applying a predetermined sub-pixel offset to the determined location of the center of the lens to produce an adjusted location of the center of the lens, to determine a gaze direction from the adjusted location of the center of the lens, and perform an action on a computing device based on the gaze direction.

14 Claims, 11 Drawing Sheets

(51) Int. Cl.
G06K 9/03 (2006.01)
H04N 5/232 (2006.01)
H04N 5/33 (2006.01)
(52) U.S. Cl.
CPC ......... G06K 9/033 (2013.01); H04N 5/23219 (2013.01); H04N 5/33 (2013.01)

(56) References Cited

U.S. PATENT DOCUMENTS

| | | | |
|---|---|---|---|
| 7,538,711 | B2 | 5/2009 | Chung et al. |
| 7,742,623 | B1 | 6/2010 | Moon et al. |
| 8,064,647 | B2 | 11/2011 | Bazakos et al. |
| 8,213,680 | B2 | 7/2012 | Fitzgibbon et al. |
| 8,745,541 | B2 | 6/2014 | Wilson et al. |
| 8,810,513 | B2 | 8/2014 | Ptucha et al. |
| 8,885,882 | B1 | 11/2014 | Yin et al. |
| 2006/0120571 | A1 | 6/2006 | Tu et al. |
| 2007/0052698 | A1 | 3/2007 | Funayama et al. |
| 2009/0196460 | A1 | 8/2009 | Jakobs et al. |
| 2012/0239396 | A1 | 9/2012 | Johnston et al. |
| 2012/0293635 | A1 | 11/2012 | Sharma et al. |
| 2013/0027296 | A1 | 1/2013 | Klein et al. |
| 2013/0121526 | A1 | 5/2013 | Smolyanskiy et al. |
| 2013/0182904 | A1 | 7/2013 | Zhang et al. |
| 2013/0290911 | A1 | 10/2013 | Praphul et al. |
| 2014/0361996 | A1* | 12/2014 | Eden ................. G06F 3/013 345/173 |
| 2015/0077543 | A1* | 3/2015 | Kerr ................. A61B 3/113 348/135 |
| 2016/0232399 | A1* | 8/2016 | Kempinski ........ G06K 9/0061 |

FOREIGN PATENT DOCUMENTS

| | | |
|---|---|---|
| WO | 2012150731 A1 | 11/2012 |
| WO | 2013029008 A1 | 2/2013 |
| WO | 2013170383 A1 | 11/2013 |

OTHER PUBLICATIONS

Li, D. et al., "Starburst: A Hybrid Algorithm for Video0Based Eye Tracking Combining Feature-Based and Model-Based Approaches," IEEE Computer Society Conference on Computer Vision and Pattern Recognition Workshops, Jun. 2005, 8 pages.*
Bar, T. et al., "Driver Head Pose and Gaze Estimation based on Multi-Template ICP 3D Point Cloud Alignment," 15th IEEE Conference on Intelligent Transportation Systems (ITSC), Sep. 2012, 8 pages.*
Funes Mora, K. et al., "Geometric Generative Gaze Estimation (G3E) for Remote RGB-D Cameras," IEEE Conference on Computer Vision and Pattern Recognition (CVPR), Jun. 2014, 17 pages.*
Dementhon, D. et al., "Model-Based Object Pose in 25 Lines of Code," International Journal of Computer Vision—Special Issue—Image Understanding Research at the University of Maryland, vol. 15, No. 1-2, Jun. 1995, 30 pages.
Zhang, Z., "A Flexible New Technique for Camera Calibration," Technical Report MSR-TR-98-71, Dec. 1998, Published in IEEE Transactions on Pattern Analysis and Machine Intelligence, vol. 22, No. 11, Nov. 2000, 22 pages.
Li, D. et al., "Starburst: a Hybrid Algorithm for Video-Based Eye Tracking Combining Feature-Based and Model-Based Approaches," IEEE Computer Society Conference on Computer Vision and Pattern Recognition Workshops, Jun. 2005, 8 pages.
Murphy-Chutorian, E. et al., "Head Pose Estimation in Computer Vision: A Survey," IEEE Transactions on Pattern Analysis and Machine Intelligence, vol. 31, No. 4, Apr. 2008, 20 pages.
Pan, G. et al., "GeeAir: A Universal Multimodal Remote Control Device for Home Appliances," Personal and Ubiquitous Computing, vol. 14, No. 8, Dec. 2010, Available Online Mar. 2010, 13 pages.

Funes Mora, K. et al., "Gaze Estimation from Multimodal Kinect Data," CVPR 2012—Computer Vision and Pattern Recognition Workshops—Face and Gesture, and Kinect Competition Workshop, Jun. 2012, 6 pages.
Ni, J. et al., "Fast Radial Symmetry Detection Under Affine Transformations," 2012 IEEE Conference on Computer Vision and Pattern Recognition, Jun. 2012, 8 pages.
Salam, H. et al., "Integrating Head Pose to a 3D Multi-Texture Approach for Gaze Detection," the International Journal of Multimedia & Its Applications (IJMA), vol. 5, No. 4, Aug. 2013, 22 pages.
Cao, X. et al., "Face Alignment by Explicit Shape Regression," International Journal of Computer Vision, vol. 107, No. 2, Apr. 2014, 8 pages.
Dedhia, Bhaven P. et al., "Object Orientation Estimation," U.S. Appl. No. 14/288,287, filed May 27, 2014, 54 pages.
Funes Mora, K. et al., "3D Gaze Tracking and Automatic Gaze Coding from RGB-D Cameras," IEEE Conference on Computer Vision and Pattern Recognition—Vision Meets Cognition Workshop, Jun. 2014, 2 pages.
Li, J. et al., "Eye-Model-Based Gaze Estimation by RGB-D Camera," IEEE Computer Vision and Pattern Recognition (CVPR) Workshops, Jun. 2014, 5 pages.
Ren, S. et al., "Face Alignment at 300 FPS via Regressing Local Binary Features," IEEE Conference on Computer Vision and Pattern Recognition (CVPR), Jun. 2014, 8 pages.
Wang, Y. et al., "A 3D Driver Head Pose Estimation Method Based on Depth Image," International Conference on Internet Multimedia Computing and Service (ICIMCS '14), Jul. 2014, 5 pages.
Xiong, X. et al., "Eye Gaze Tracking Using an RGBD Camera: A Comparison with an RGB Solution," 2014 ACM International Conference on Pervasive and Ubiquitous Computing (UBICOMP '14), Sep. 2014, 9 pages.
Maind, S. et al., "A Review on Hand and Speech Based Interaction With Mobile Phone," International Conference on Advances in Engineering & Technology (ICAET—2014), Oct. 2014, 5 pages.
IPEA European Patent Office, Second Written Opinion Issued in Application No. PCT/US2015/067758, dated Oct. 11, 2016, WIPO, 6 Pages.
ISA European Patent Office, International Search Report and Written Opinion Issued in Application No. PCT/US2015/067758, dated Apr. 19, 2016, WIPO, 10 Pages.
Shen, et al., "Evolutionary Adaptive Eye Tracking for Low-Cost Human Computer Interaction Applications", In Journal of Electronic Imagingm vol. 22, Issue 1, Mar. 1, 2013, 24 pages.
Valenti, et al., "Accurate Eye Center Location through Invariant Isocentric Patterns", In Proceedings of IEEE Transactions on Pattern Analysis and Machine Intelligence, vol. 34, Issue 9, Sep. 2012, 14 pages.
Rana, et al., "Eye Detection and Iris Center Tracking with Eyelashes Occlusion Correction", In Proceedings of International Arab Conference on Information Technology, Dec. 2013, 5 pages.
Wang, et al., "Iris Recognition Using Independent Component Analysis", In Proceedings of the Fourth International Conference on Machine Learning and Cybernetics, Aug. 18, 2005, 6 pages.
Li, et al., "A Fast and Accurate Iris Localization Method Based on Gray Level Statistics and Region Properties", In Proceedings of International Conference on Machine Learning and Cybernetics, Jul. 14, 2013, 6 pages.
Ziauddin, et al., "A Robust Hybrid Iris Localization Technique", In Proceedings of fith International Conference on Electrical Engineering/Electronics, Computer, Telecommunications and Information Technology, vol. 2, May 6, 2009, 4 pages.
Sesma, et al., "Evaluation of Pupil Center-Eye Corner Vector for Gaze Estimation Using a Web Cam", In Proceedings of the Symposium on Eye Tracking Research and Applications, Mar. 28, 2012, 4 pages.
Bandera, et al., "Residual Q-Learning Applied to Visual Attention", In Proceedings of the Thirteenth International Conference on Machine Learning, Jul. 3, 1996, 8 pages.
Sprague, et al., "Eye Movements for Reward Maximization", In Proceedings of Advances in Neural Information Processing Systems, Dec. 8, 2003, 8 pages.

(56) References Cited

OTHER PUBLICATIONS

IPEA European Patent Office, International Preliminary Report on Patentability Issued in PCT Application No. PCT/US2015/067758, dated Feb. 6, 2017, WIPO, 7 Pages.

* cited by examiner

GAZE DETECTION OFFSET FOR GAZE TRACKING MODELS

BACKGROUND

Gaze tracking may find use in many applications, including but not limited to human-computer interactions, visual attention analysis, and assistive technologies for people with disabilities. For example, a gaze direction of a person may be tracked to determine a location at which the person's gaze intersects a graphical user interface of a computing system. The determined location then may be used as an input signal for interacting with the graphical user interface.

SUMMARY

Examples are disclosed herein that are related to gaze tracking. One example provides a computing device including an eye-tracking system including an image sensor, a logic device, and a storage device comprising instructions executable by the logic device to track an eye gaze direction by acquiring an image of the eye via the eye-tracking system and determining a determined location of a center of a lens of the eye from the image of the eye. The instructions are further executable to adjust a determined location of the center of the lens of the eye by applying a predetermined sub-pixel offset to the determined location of the center of the lens of the eye to produce an adjusted location of the lens center, determine a gaze direction from the adjusted location of the lens center, and perform an action on a computing device based on the gaze direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Gaze tracking systems may utilize image sensors to acquire image data of a person's eye. For example, some gaze tracking systems may utilize infrared images of a person's eye to locate corneal reflections of light ("glints") from glint light sources (e.g. infrared light sources directed toward the person's eye) to determine a person's gaze direction. Other methods may use visible or infrared cameras without such glint light sources, as described in more detail below.

The use of image data to track gaze may allow eye structures to be located with accuracies on the dimensional order of an image sensor pixel. However, pixel-level accuracy in locating an eye structure may still lead to potential errors in gaze tracking due to sub-pixel differences between the determined location of the eye structure and the actual location of the eye structure. Thus, examples are disclosed that relate to the use of a sub-pixel offset applied to a determined eye structure location during gaze tracking, and also to the determination of such sub-pixel offsets.

Figure 1:
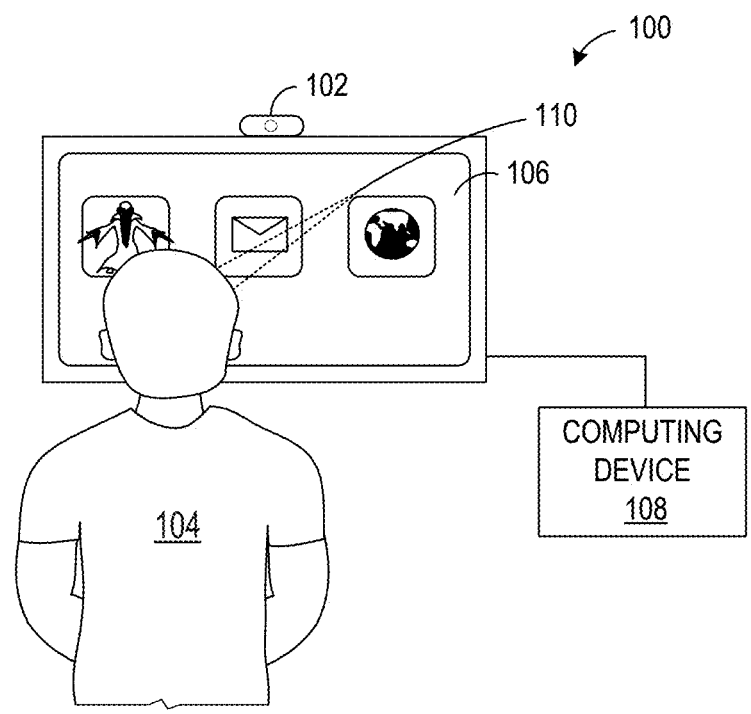
FIG. 1 shows an example gaze tracking system.

Prior to describing sub-pixel offsets in more detail, an example gaze tracking method is described. It will be understood, however, that the sub-pixel offsets as disclosed herein may be used with any suitable image-based gaze tracking method. FIG. 1 shows a gaze tracking system 100 comprising an image sensor 102 used to acquire images of a person 104 viewing a display 106 of a computing device 108. Images of the person's eyes may be used to determine a gaze direction, which may be used to determine a location 110 at which a gaze of person 104 intersects display 106. Location 110 then may be used as a position signal for interacting with a graphical user interface displayed on display 106. While depicted in the context of a larger format display (e.g. a monitor or television), it will be understood that the disclosed examples may be used with any suitable computing device, including but not limited to mobile devices, wearable devices, etc. Further, it will be understood that image sensor 102 may represent any suitable type of image sensor and/or combination of image sensors. For example, image sensor 102 may represent a visible light image sensor, an infrared image sensor, a depth image sensor, and/or two or more of such sensors, whether enclosed in a common housing or separately housed. Such an image sensor may be incorporated into a computing device performing gaze tracking, or may be physically separate from the computing device.

Figure 2:
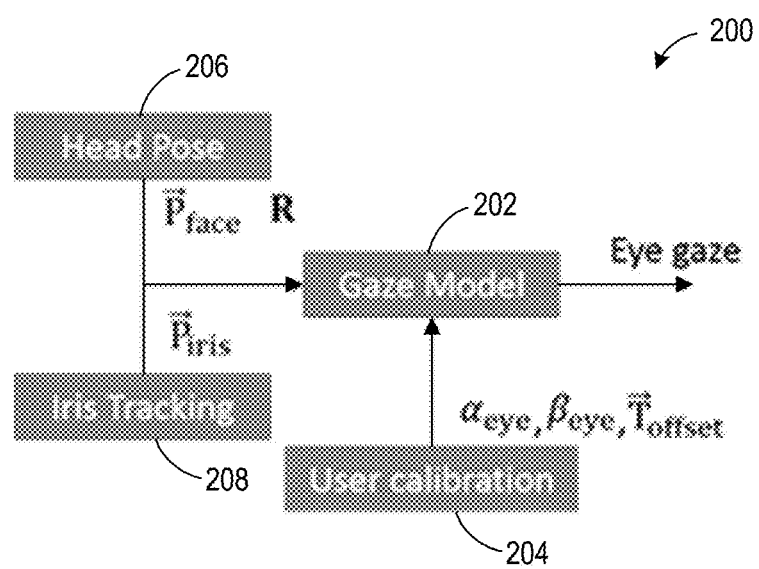
FIG. 2 shows a schematic representation of an example gaze tracking process pipeline.

FIG. 2 shows a schematic representation of a gaze tracking pipeline 200 useable with gaze tracking system 100. Gaze tracking pipeline 200 utilizes a gaze model 202 that employs a face model and visual axis offset adapted to the anatomical features of individual users via user calibration 204. User calibration 204 may be performed, for example, to determine biometric parameters such as $\alpha_{eye}$ and $\beta_{eye}$, representing calibrated offsets between an optical axis and a visual axis, and also $\vec{T}_{offset}$, a calibrated offset vector between an eye rotation center and a face anchor point. Gaze model 202 further utilizes a head pose 206 and an iris (or pupil) location determined from iris (or pupil) tracking 208 as inputs. Head pose 206 may include information such as a head rotation matrix R and a face anchor point $\vec{P}_{face}$, whereas an iris location may be determined as an iris center $\vec{P}_{iris}$. As described below, these inputs may be determined from image data, such as two dimensional visible or infrared image data capturing a user's face. Using these inputs, gaze model 202 may be used to determine an eye gaze direction 210.

Figure 3:
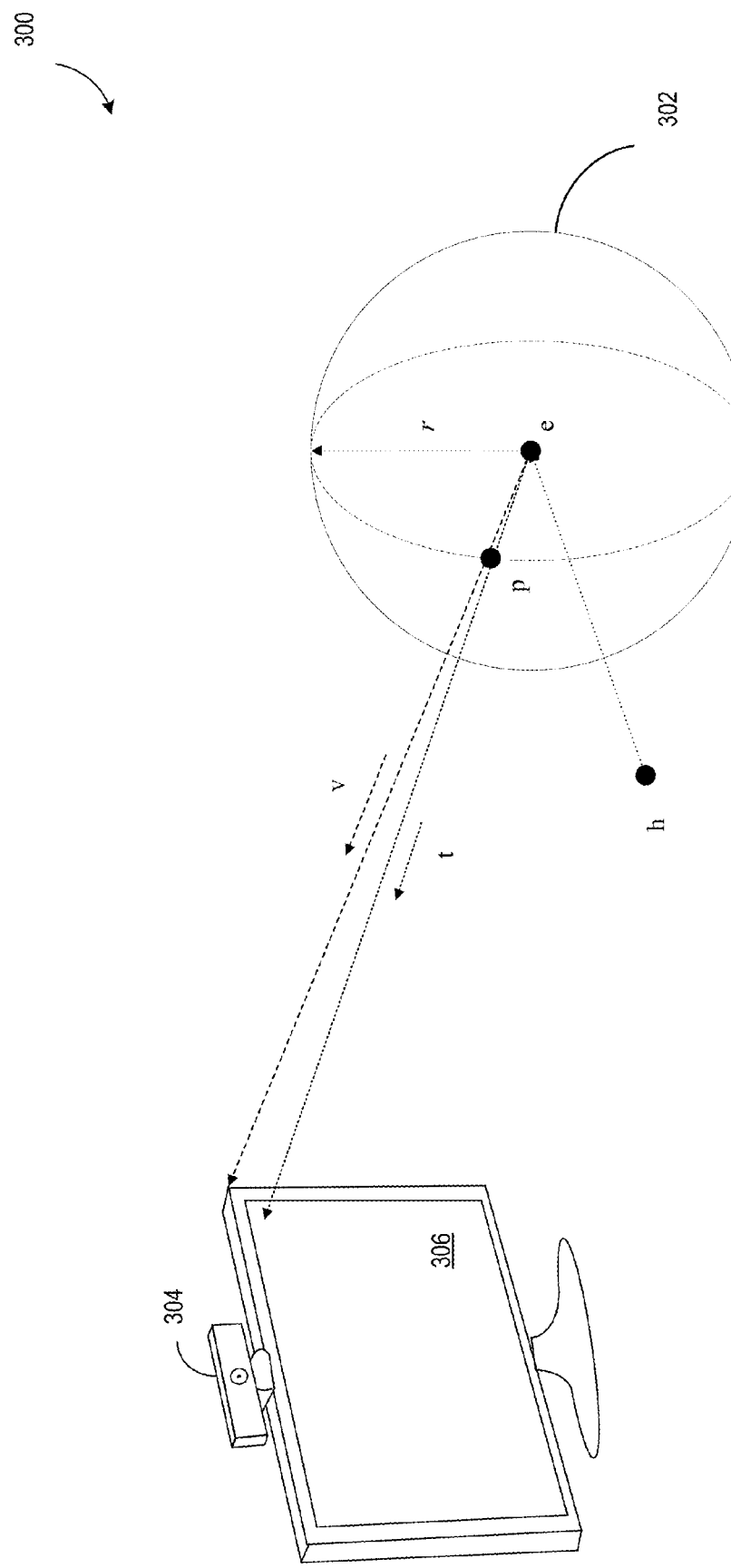
FIG. 3 shows a geometric representation of an example gaze model.

FIG. 3 shows a geometric representation of an example gaze model 300 that may be utilized with the gaze tracking pipeline of FIG. 2 to determine a gaze direction. A simplified representation of an eye is shown as an eyeball sphere 302. An image sensor 304 is configured to capture image data of the eye gazing at a screen 306 of a display interface. In FIG. 3, pupil center p lies on the eyeball sphere 302, and eyeball center e represents the center of eyeball sphere 302. An optical axis t may be defined by a straight line passing through eyeball center e and the pupil center p. A visual axis v, which corresponds to the gaze direction, may differ from t by an offset angle $\alpha_{eye}$ in the horizontal direction and/or an offset angle $\beta_{eye}$ in the vertical direction. The offset between the visual axis and the optical axis may arises due to the fovea of the human eye not being centered on the optical axis of the eye.

For each person, where the head coordinate system is centered at h, several biometric parameters may be initially unknown, including eyeball center e, eyeball radius r, $\alpha_{eye}$, and $\beta_{eye}$. These parameters may be inferred via calibration, as mentioned above. After calibration, a gaze direction may be estimated using these parameters. For example, the eyeball center at time t, $e^t$, may be translated from head coordinates to 3D world coordinates as follows:

$$e^t = h^t + R_h^t e,$$

where $h^t$ and $R_h^t$ denote the head center and head rotation matrix, respectively, at time t. As described in further detail below, the 3D head pose, used to determine $h^t$ and $R_h^t$, may be estimated from a 2D visible spectrum image. The optical axis direction $t^t$ may be represented as a normalized vector from $e^t$ to $p^t$, where $p^t$ denotes the pupil center at time t. Once the optical axis direction $t^t$ is determined, the visual axis direction $v^t$, i.e. the gaze direction, may be found by rotating the optical axis t horizontally by $\alpha_{eye}$ degrees and vertically by $\beta_{eye}$ degrees. Visual axis direction $v^t$ may be computed as follows:

$$v^t = R_h^t R_{\alpha,\beta} (R_h^t)^{-1} t^t,$$

where $$R_{\alpha,\beta} = \begin{bmatrix} 1 & 0 & 0 \\ 0 & \cos\beta & \sin\beta \\ 0 & -\sin\beta & \cos\beta \end{bmatrix} \begin{bmatrix} \cos\alpha & 0 & -\sin\alpha \\ 0 & 1 & 0 \\ \sin\alpha & 0 & \cos\alpha \end{bmatrix}.$$

It will be noted that head rotation may be removed prior to applying the rotation offset between the optical and visual axes.

Figure 4:
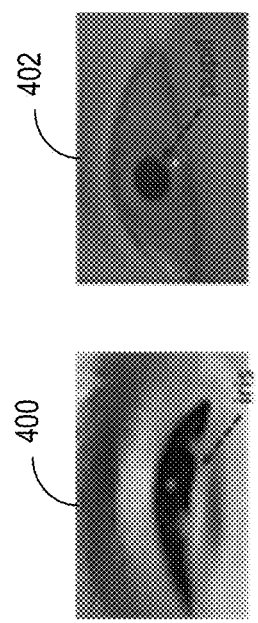
FIG. 4 shows examples images of an eye acquired with a visible light camera and with an infrared camera.

Any suitable type of image data may be used to determine the biometric parameters for gaze determination as disclosed herein. For example, in some examples, two dimensional (2D) visible color or grayscale image data may be used to detect an iris, as a boundary of the iris may show a strong feature contour in a visible light image. FIG. 4 shows an example visible light color RGB (red/green/glue) image 400 in which the iris is visible. In other examples, 2D infrared images may be used to detect a pupil. FIG. 4 also shows an infrared image 402 in which the pupil, rather than the iris, is sharply visible. Thus, it will be understood that, while the examples herein are described in terms of iris tracking using visible light image, pupil tracking also may be used in some implementations in place or of or in addition to In either case, the determined outline of the iris or pupil may be used to determine a location of a center of a lens of the eye.

Continuing with FIG. 3, image sensor 304 may comprise any suitable type and number of image sensors, such as color (e.g. RGB) cameras, depth cameras, and/or infrared cameras. However, where more than one type of image sensor is utilized, one image sensor may have a different coordinate system than that of another image sensor. Further, the display interface screen 306 may have yet another coordinate system different than that of any of the image sensors. As such, a system calibration step may transform the coordinate systems of each of the image sensor(s) and the screen into a single, consistent coordinate system. For example, in a gaze tracking system utilizing both an RGB camera and a depth camera, the depth camera coordinate system and the screen coordinate system may both be calibrated to the RGB camera coordinate system. In some examples, the screen calibration may be performed by utilizing an auxiliary camera and a calibration pattern in front of the screen such that the auxiliary camera captures both the calibration pattern and the screen while the RGB camera also captures the calibration pattern. In other examples, any other suitable system calibration process may be used to match the different coordinate systems.

While the iris and/or the pupil of an eye may be detected in image data, and thus used to determine the iris and/or pupil center p, the eyeball center e, or eye rotation center, may not be directly visible in an image. Accordingly, the eye rotation center may be estimated by determining a head pose of the person. The eye rotation center may be represented as $\vec{P}_{eye} = \vec{P}_{face} + R\vec{T}_{offset}$, where $\vec{P}_{eye}$ is the position of the eye rotation center, $\vec{P}_{face}$ is the position of a face anchor point, R is a head rotation matrix, and $\vec{T}_{offset}$ is an offset vector between the eye rotation center and the face anchor point in a frontal pose of the head. The face anchor point $\vec{P}_{face}$ may comprise a facial landmark point, for example an eye inner corner, may comprise an average of a number of different facial landmark points, and/or may comprise a centroid of face mesh vertices. Such face landmark points are located on the surface of the person's face and may be estimated from 2D RGB and/or infrared images, for example using a face alignment method. Any suitable face alignment method may be used, including but not limited to explicit shape regression and local binary feature regression. The result of face alignment may provide 2D coordinates of face landmark points on a 2D RGB and/or infrared image, which may be further converted to 3D coordinates if depth image data is also available. It will be understood that when depth image data is unavailable, 3D coordinates may still be estimated from the 2D image data as described elsewhere herein. Further, the head rotation matrix R and the position of the face anchor point $\vec{P}_{face}$ may be determined by using any suitable head pose determination methods, including but not limited to the Procrustes analysis and active appearance model (AAM)-based high definition face tracking methods. $\vec{T}_{offset}$ is person-specific and may be calibrated for each different person.

Figure 5C:
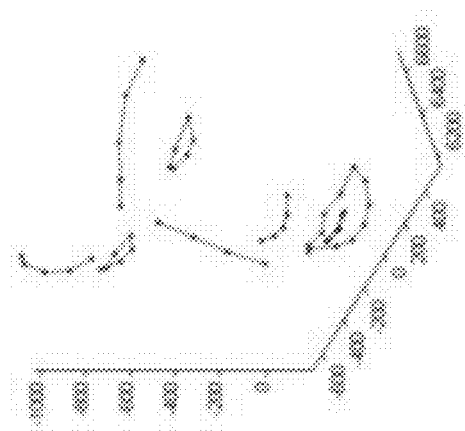
FIGS. 5A-C show example outputs of facial landmark detection and head pose estimation.
Figure 5B:
Figure 5A:
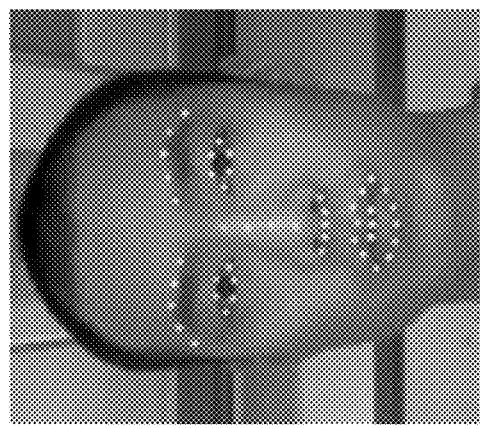

In one non-limiting example, where depth image data is available, facial landmarks on the RGB image may be tracked using a Supervised Descent Method (SDM). FIG. 5A shows an example output of SDM utilized to track facial landmarks. Based on 2D coordinates of the facial landmarks, corresponding 3D coordinates may be estimated from depth data. For tracking head pose, a person-specific 3D face model may be calibrated for each person. During calibration, the person may be instructed to keep a frontal pose to the infrared depth camera for a specified amount of time, e.g. one second. While the person holds the frontal pose, the infrared depth camera may capture image data and collect, for example, 10 sets of 49 different 3D facial landmarks, and average the sets of data to determine a reference 3D face model, $X_{ref}$. $X_{ref}$ may be defined, for example, as a matrix of size 3×n, where n is the number of landmarks and each column in the matrix represents the 3D position of one facial landmark. In an example experiment, to help increase the robustness of the head pose to facial expression changes, 13 rigid points on the face were used as facial landmarks, as shown in FIG. 5B. FIG. 5C shows an example 3D face model built based on experimental calibration data sets for a person.

A person's head pose may be measured relative to the reference model $X_{ref}$. The 3D head pose at frame t, (head rotation matrix $R_h^t$, translation vector $t^t$) may be obtained in any suitable manner. As one example, the 3D head pose at frame t may be obtained by minimizing the following equation:

$$\arg\min_{R_t, t_t} \|R_h^t X_{ref} + 1_{1 \times n} \otimes t^t - X^t\|,$$

where ⊗ denotes the Kronecker product and $1_{1 \times n}$ is a row vector of ones of size n. The above formulation is also known as the orthogonal Procrustes problem, which may be solved by finding a closest orthogonal matrix that maps $R_h^t$ to $X_{ref}$ using Singular Value Decomposition. However, least squares fitting may be sensitive to outliers. Infrared depth image data occasionally may produce zero depth values due to sensor noise. Thus, a local neighborhood search may be performed for any missing depth values. However, deriving the depth value for a missing point from a neighbor's depth value may result in a deviation from the true depth value. As such, points with fitting errors more than two standard deviations away from the mean may be removed, and a further minimization step may be repeated using the Procrustes equation on using the remaining points.

It will be noted that while depth imaging may be utilized in the disclosed gaze tracking methods, the methods also may be performed without depth data. For example, head pose may also be estimated from calibrated 2D image data and a person-specific face model, such that 2D face landmark points on 2D RGB or infrared images may be used to estimate the corresponding 3D positions. As a non-limiting example, the 3D positions may be iteratively estimated using Pose from Orthography and Scaling with ITerations (POSIT). After locating facial landmarks on 2D image data, for each frame, POSIT may be used to estimate the person's head pose, for example, by iteratively minimizing the error between the predicted projection of a known 3D model and 2D landmarks tracked.

As mentioned above, the gaze tracking methods as disclosed may permit gaze tracking to be performed by using visible light (e.g. ambient light within the environment) to locate an iris of a user, as a boundary of the iris may be sharply defined in 2D RGB images. Likewise, a boundary of a pupil may be located via infrared data. To perform gaze tracking in this manner, the boundary of the iris (or pupil) may be represented as an ellipse fitted to the boundary. This may allow an iris center $\vec{P}_{iris}$ (or pupil center) to be determined from the ellipse, and a lens center to be inferred based upon the iris center (or pupil center).

Any suitable ellipse fitting methods may be used, including but not limited to Starburst, a hybrid eye-tracking algorithm that integrates feature-based and model-based approaches. Starburst iteratively locates ellipse edge points and performs fast radial symmetry detection, which is similar to a Hough transform. Machine learning-based methods may also be utilized to detect the iris center (or pupil center) by extracting image features and training classifiers with manually labeled ground truth.

Figure 6:
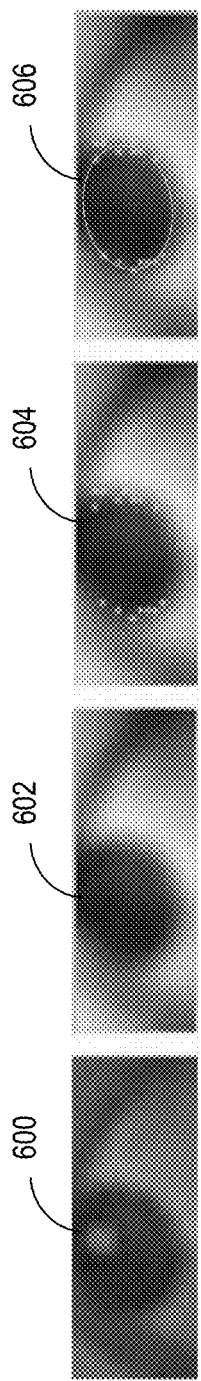
FIG. 6 shows images representing example data sets at various steps during an iris detection process.

FIG. 6 shows example data steps at various points in an iris detection process that using the Starburst ellipse fitting method. First, 600 shows an eye image cropped from a larger image using facial feature detection. Histogram equalization may then be applied to increase a contrast of the eye image. A binary image is shown at 602 that may be created by thresholding each pixel with a mean pixel value in the eye image. Connected-component analysis may be performed to fill holes, such as those caused by specular reflections, in the iris region followed by a Gaussian blur. In one non-limiting example, thirty rays may be emitted from a seed point terminated on the boundary of a polygon that defines the eye region. The direction of the rays may be uniformly distributed between −45° to 45° and 135° to 225°. Such a range may be acceptable to account for the possibility that portions of the iris may be occluded by the eyelids. The point yielding a greatest gradient value along each ray is considered as a candidate point of the iris boundary. The candidate points with gradient values lower than a predefined threshold may be removed, and the remaining points may be used to fit the ellipse. Further, candidate points with fitting residuals greater than two standard deviations away from the mean may be considered as outliers, and may thus be removed. An ellipse may then be refit on the remaining candidate points. The iris center (and thus the center of the lens) then may be estimated as the center of the fitted ellipse. It will be understood that the above-described ellipse-fitting method is described for the purpose of example, and that any other suitable ellipse fitting method may be used.

Figure 7:
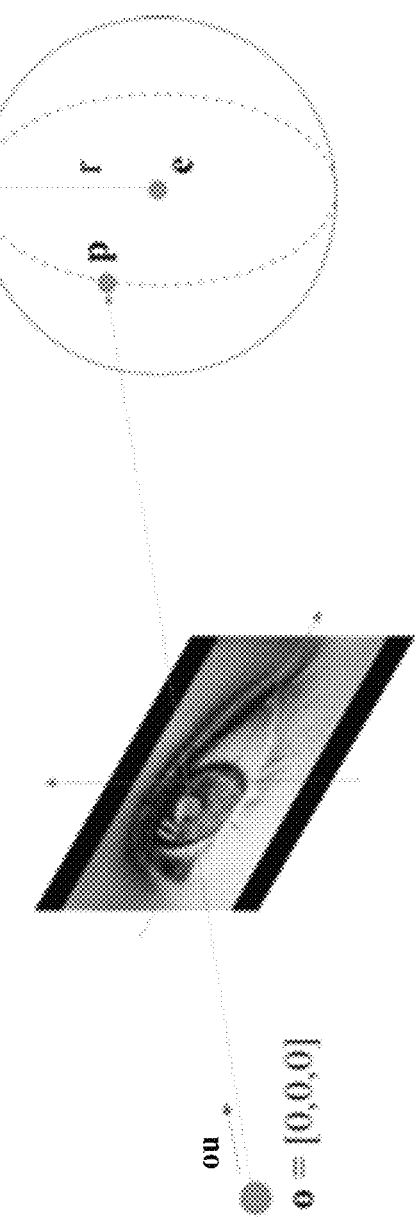
FIG. 7 shows an example mapping of 2D to 3D geometries of a pupil center.

FIG. 7 illustrates an example mapping of 2D and 3D geometries of a pupil center. Given the pupil center with 2D coordinates [u, v] in an ellipse-fitted image, the 3D position of the pupil center p in the 3D world may be determined. The 3D pupil center p is the intersection point between the eyeball sphere 700 and line $\vec{ou}$, where the camera center o is at the origin. The 3D coordinate corresponding to the 2D coordinate of the pupil center may be denoted as u=[u−$u_0$, v−$v_0$, f], where [$u_0$, $v_0$] is the image center from camera intrinsic parameters, and f is the camera focal length in pixels.

As described above, some biometric parameters, including the horizontal angle $\alpha_{eye}$ and the vertical angle $\beta_{eye}$ between the visual and optical axes, as well as the offset vector $\vec{T}_{offset}$, may be person-specific and thus initially unknown. Therefore, these quantities may be calibrated for each different person. A calibration process also may be configured to determine an eyeball center and eyeball radius.

An accuracy of the measurement of the iris or pupil boundary, and thus an accuracy of a determined lens center, may be constrained by a resolution of the image sensor. When mapped to a real-world environment (e.g., to an intersection of a gaze direction with a display), sub-pixel errors may potentially result in inaccuracies when determining gaze targets, and therefore lead to errors in user interface interactions.

Figure 8:
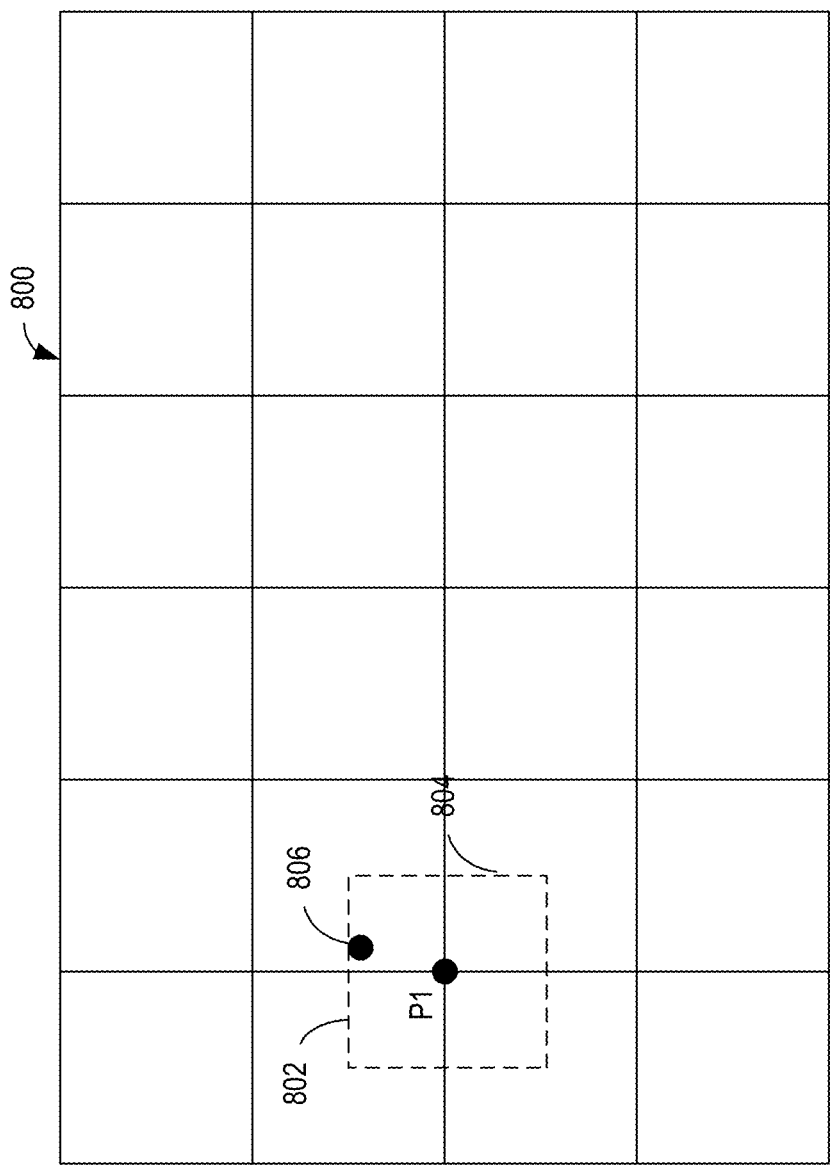
FIG. 8 shows a schematic depiction of an example mapping of a determined eye lens center on an image sensor.
Figure 9:
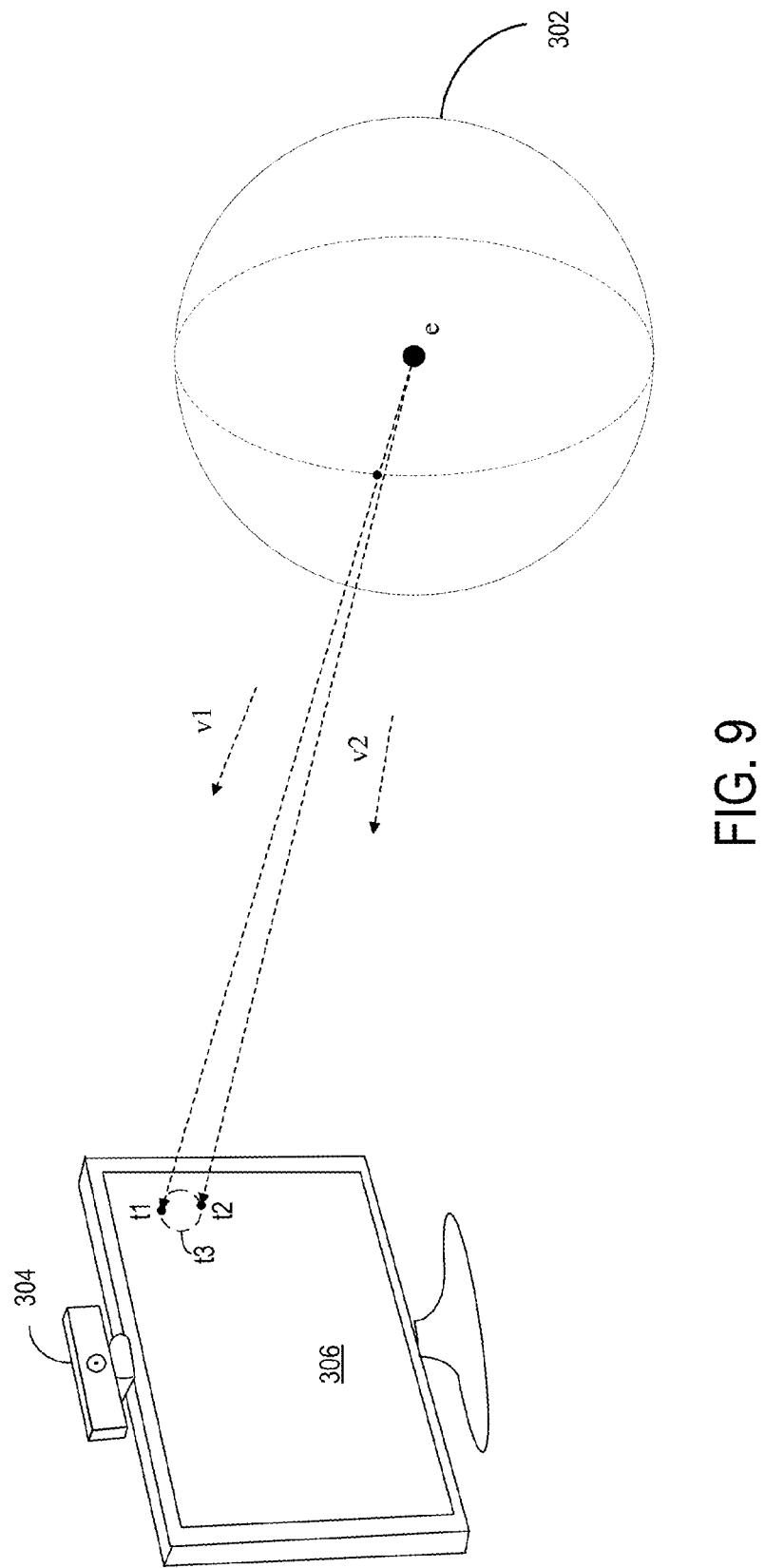
FIG. 9 shows a schematic depiction of an example of error that may arise from not applying a sub-pixel adjustment to a determined eye lens center.

FIG. 8 schematically shows a schematic depiction of pixels of an image sensor 800. As illustrated, a measurements of a lens center may be resolved to a location of pixel P1. However, the actual location of the lens center may be located within a sub-pixel area 802 around pixel P1. FIG. 9 illustrates a difference between an example vision line v1 that extends through a determined lens center and a corresponding actual vision line v2, and shows a potential for erroneous user interface interactions based upon this difference.

Figure 10:
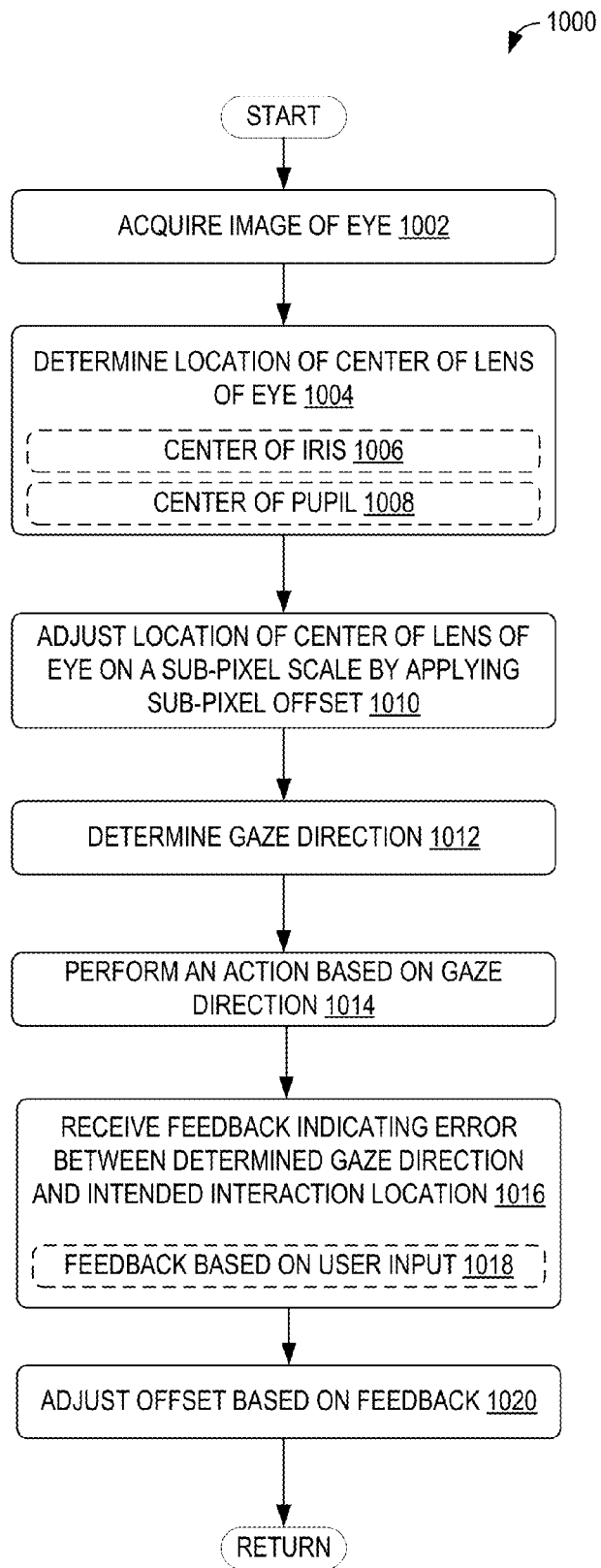
FIG. 10 shows an example method of applying a sub-pixel offset to a determined eye lens center.

Thus, in order to help reduce an error rate of gaze-based interactions, a sub-pixel offset, e.g. as determined from training data, may be applied to a lens center estimation. FIG. 10 shows a flow diagram illustrating an example method 1000 for determining a gaze direction based on a sub-pixel offset applied to a determined location of a center of a lens of an eye. Method 1000 may be performed by a gaze tracking module of computing device 108 of FIG. 1, or via any other suitable computing device. At 1002, method 1000 includes acquiring an image of an eye from an image sensor, and at 1004, determining a determined location of a center of a lens of the eye based on the image. For example, the method may include determining a location of a center of an iris (e.g., based on an image captured by an RGB camera), as indicated at 1006, and/or a center of a pupil (e.g., based on an image captured by an infrared camera), as indicated at 1008. In some examples the centers of the pupil or iris may be determined by fitting an ellipse to an outer boundary of the pupil or iris as determined from image data, and then determining the center of the ellipse. It is to be understood that any other suitable method for determining the center of the lens may be used.

At 1010, method 1000 includes adjusting the determined location of the center of the lens on a sub-pixel scale by applying a predetermined sub-pixel offset to produce an adjusted lens center location. Method 100 further comprises, at 1012, determining a gaze direction based on the adjusted lens center location. Any suitable method may be used to determine a gaze direction from a determined lens center location, including but not limited to those described above that utilize a personalized face model. Method 1000 further comprises, at 1014, performing an action on a computing device based on a gaze direction. As one non-limiting example, the determined gaze direction may be mapped to a location on a display device (e.g., an intersection of a vector representing the gaze direction and the display in the physical space), and the determined location may be used as a position signal to interact with a graphical user interface displayed on the display. In such an example, an action corresponding to a user interface element at a location of the position signal may be performed. In other examples, the determined location signal may be stored in order to track a movement of the gaze over time, for example to detect a gaze-based gesture, and the action may correspond to such a gesture. It is to be understood that any suitable action may be performed responsive to determining the gaze direction.

In some implementations, a predetermined sub-pixel offset may be varied over time based upon user feedback. This is illustrated at 1016, where feedback is received that indicates an error between the determined gaze direction and an intended interaction location. Such feedback may take any suitable form. For example, feedback may be based on user input, as indicated at 1018. As more specific examples, a user may indicate error by performing an undo action, expressing frustration, performing multiple repetitions of a command in quick succession, and/or providing other inputs indicating an error in the gaze detection. Other feedback may be computer based. For example, a computer may determine that a gaze direction intersects a displayed graphical user interface close to, but not directly at, a potentially intended gaze target, such as a nearby user interface element. Based upon such feedback, method 100 may include adjusting the sub-pixel offset. For example, the sub-pixel offset may be adjusted in such a manner as to reduce the error between the determined gaze location and an apparent intended gaze target.

Figure 11:
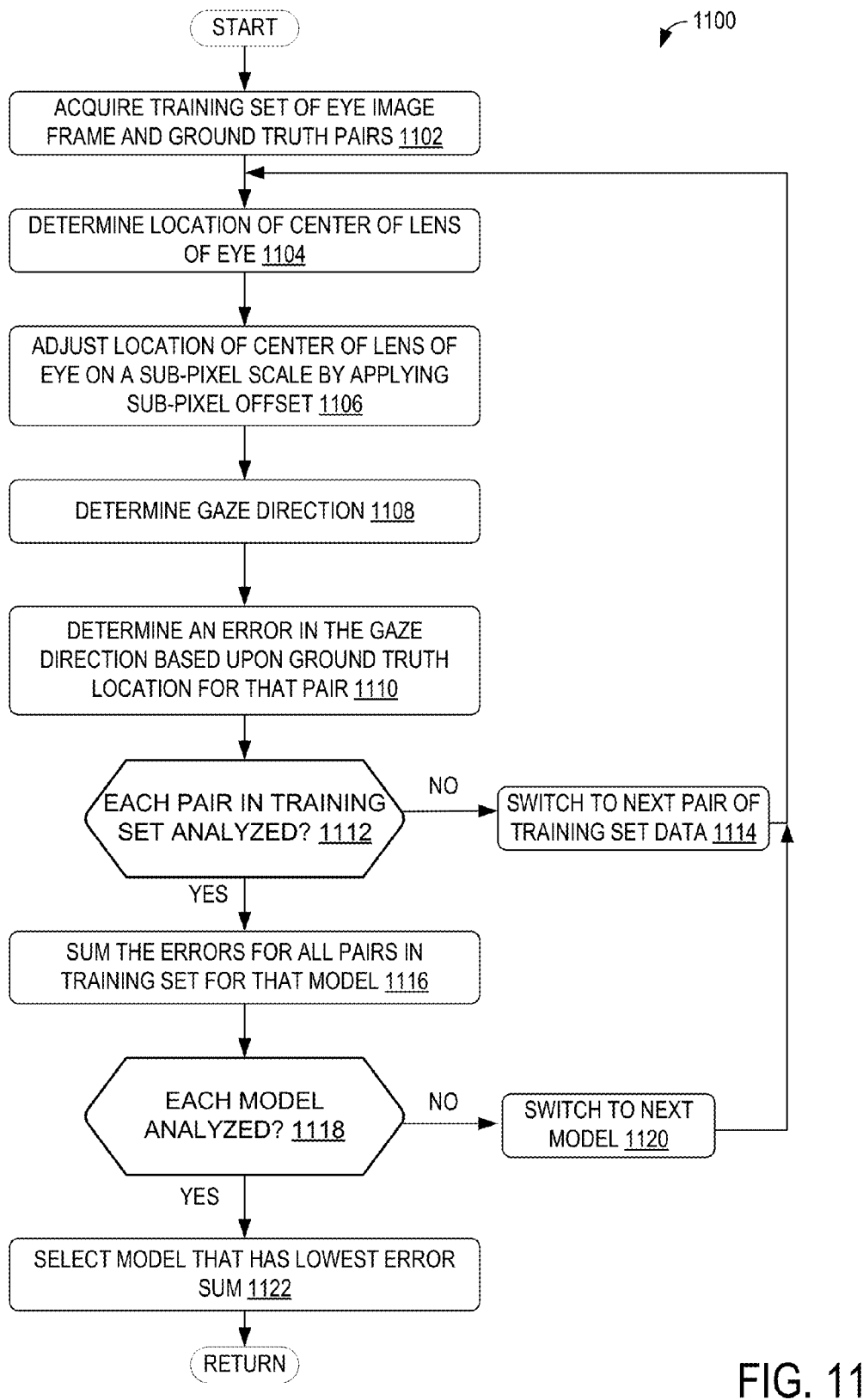
FIG. 11 shows an example method of determining a sub-pixel offset for an eye lens center.

A sub-pixel offset to be applied during gaze tracking may be determined in any suitable manner. For example, a sub-pixel adjustment may be determined by machine learning utilizing a training set of image data that is manually tagged with relevant data (e.g. pupil/lens/iris center locations). However, tagging of images on a sub-pixel level may be extremely difficult, time-consuming and expensive. As such, FIG. 11 shows a flow diagram illustrating an example of a method of training a model for sub-pixel offset determination that does not utilize tagged data. Method 1100 may be performed by any suitable computing device. At 1102, method 1100 includes acquiring a training set of eye image frame and ground truth pairs. This data may be gathered in any suitable manner. As one example, a training process may be utilized in which a series of gaze targets are displayed at various locations on a display device, and a series of associated images of a user's eye are captured while the user is gazing at the gaze targets. In this way, the location of the target may be utilized as ground truth location data that can be compared to a gaze location determined via a gaze determination model, such as that described above.

Method 1100 further includes, at 1104, determining a determined location of a center of a lens of an eye from the image data. The lens center may be determined in any suitable manner. For example, a lens center may be determined by determining a boundary of an iris or a pupil of the eye, and then locating the center from the determined boundary. After determining the location of the center of the lens, method 1100 includes adjusting the location of the center of the lens of the eye on a sub-pixel scale by applying a sub-pixel offset. The sub-pixel offset applied may be based on a machine-trainable model for gaze tracking, wherein the model may comprise a set of weighting factors that can be adjusted during an optimization process. One such method for determining the sub-pixel offset for the model is described in more detail below.

Continuing with FIG. 11, method 1100 includes determining a gaze direction based upon the image data and the sub-pixel offset determined from the model, as indicated at 1108. Upon determining the gaze direction, an error in the determined gaze direction may be determined based on the ground truth location for that pair, as indicated at 1110. As the ground truth location indicates the intended target of the gaze direction, the error may be determined as a difference between the intended target (e.g., the ground truth location) and the estimated target (e.g., the location on the display where the gaze direction intersects the display). In some examples, this error may be normalized in order to account for the differences when converting from a gaze direction based on an image sensor location to a gaze target based on a location on a display device.

Continuing with FIG. 11, if each pair in the training set has not yet been analyzed (e.g., "NO" at 1112), then method 1100 proceeds to 1114 to move to a next image frame/ground truth data pair, and to repeat steps 1104-1110 for that pair. In this way, the method may iteratively evaluate an error in the gaze direction for each pair of the training data using a model. Once each pair has been evaluated (e.g., "YES" at 1112), the method proceeds to 1116 to sum all of the calculated errors for all pairs in the training set. The sum calculated at 1116 may be stored in a table and/or otherwise associated with the model used to determine the location of the center of the lens of the eye and the sub-pixel offset.

Upon completing the evaluation for all image/ground truth pairs in the training data set, method 1100 includes determining if each model (e.g., each set of different weighting factors) has been analyzed. If it is determined that additional sets of weighting factors are to be evaluated (e.g. "NO" at 1118), then method 1100 proceeds to 1120 to utilize a different set of weighting factors, and then returns to 1104 to evaluate all pairs of the training data in accordance with the new weighting factors.

Once each set of weighting factors has been analyzed, then method 1100 comprises proceeds to 1122 to select the model that has the lowest error of the evaluated models, and the sub-pixel offset produced by this model may be used for determining gaze direction.

The various evaluations described above with regard to FIG. 11 may be performed in any suitable manner. In some examples, the evaluation may be performed based upon the following equation:

$$w_{select} = \arg\min_{w} \sum_{i=1}^{m} \max_{\delta R} P[\delta R \mid x_i; w] \|y_i - g(x_i, R + \delta R)\|_2^2,$$

where $w_{select}$ is the model selected at 1120, w is the model used in a given iteration of the equation, m is the number of models to be tested, $\delta R$ is the sub-pixel offset, $x_i$ is the feature vector currently extracted from the image (e.g., the eye image frame for the training pair i), $y_i$ is the ground truth location for the training pair i, g is a function representing the gaze direction determination, and R is the estimated pixel location of the eye lens center prior to application of the offset $\delta R$. By determining the most probable sub-pixel offset given a particular model and image information, that sub-pixel offset may be utilized to determine a most probable gaze direction (e.g., normalized to a location on the display, as represented by $y_i$) using that model. The error associated with a model for a training pair may be determined as a difference between the ground truth location on the display and the location at which the determined gaze direction intersects the display. For each of m possible models, the sum of all errors is determined, and the model with the minimum error sum is selected as $w_{select}$.

Applying a sub-pixel offset to a determined lens center for an eye as described above may help to reduce an error rate of a user interface that employs gaze tracking. Further, as described herein, a sub-pixel offset to be applied may be determined during development without having to manually label training data, and the determined sub-pixel offset can be updated on a per-user basis based upon feedback received during end use. This may allow the initially-determined sub-pixel offset to be adapted to individual users.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
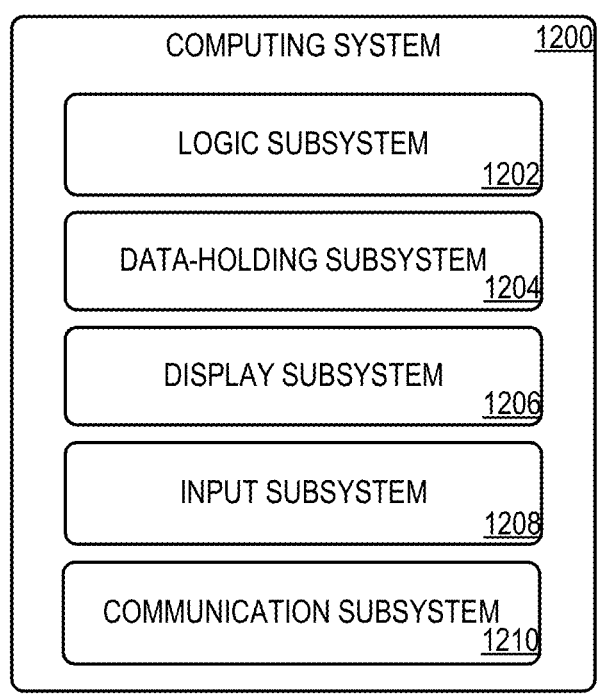
FIG. 12 shows a block diagram of an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. Gaze tracking system 100 is a non-limiting example implementation of computing system 1200.

Computing system 1200 includes a logic subsystem 1202 and a storage subsystem 1204. Computing system 1200 may optionally include a display subsystem 1206, input subsystem 1208, communication subsystem 1210, and/or other components not shown in FIG. 12.

Logic subsystem 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1202 may include one or more processors configured to execute software instructions. Additionally or alternatively, logic subsystem 1202 may include one or more hardware or firmware logic machines configured to execute hardware or firmware instructions. Processors of logic subsystem 1202 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 1202 may be virtualized and executed by remotely accessible, networked computing devices configured in a cloud-computing configuration.

Storage subsystem 1204 includes one or more physical devices configured to hold instructions executable by logic subsystem 1202 to implement the methods and processes described herein. When such methods and processes are implemented, the state of storage subsystem 1204 may be transformed—e.g., to hold different data.

Storage subsystem 1204 may include removable and/or built-in devices. Storage subsystem 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1204 may include volatile, nonvolatile, dynamic, static, read/write, read-only, random-access, sequential-access, location-addressable, file-addressable, and/or content-addressable devices.

It will be appreciated that storage subsystem 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1202 and storage subsystem 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

Display subsystem 1206 may be used to present a visual representation of data held by storage subsystem 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic subsystem 1202 and/or storage subsystem 1204 in a shared enclosure, or such display devices may be peripheral display devices.

Input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

Another example provides a computing device comprising an eye-tracking system comprising an image sensor, a logic device, and a storage device comprising instructions executable by the logic device to tracking an eye gaze direction by acquiring an image of the eye via the eye-tracking system, determining a determined location of a center of a lens of the eye from the image of the eye, the location being determined on a pixel scale, adjusting a determined location of a center of the lens of the eye on a sub-pixel scale by applying a predetermined sub-pixel offset to the determined location of the center of the lens of the eye to produce an adjusted location of the center of the lens, determining a gaze direction from the adjusted location of the center of the lens, and performing an action on a computing device based on the gaze direction. In such an example, the image sensor may additionally or alternatively comprise a visible light camera, and the instructions may additionally or alternatively be executable to determine the determined location of the center of the lens by determining a boundary of an iris of the eye and determining a center of the iris based upon the boundary of the iris. In such an example, the instructions may additionally or alternatively be further executable to apply the sub-pixel offset to the determined center of the iris. In such an example, the image sensor may additionally or alternatively comprise an infrared camera, and the instructions may additionally or alternatively be executable to determine the determined location of the center of the lens of the eye by determining a boundary of a pupil of the eye and determining a center of the pupil based upon the boundary of the pupil. In such an example, the instructions may additionally or alternatively be further executable to apply the sub-pixel offset to the determined center of the pupil. In such an example, the instructions may additionally or alternatively be further executable to receive feedback regarding error between gaze direction and an intended interaction location on a user interface, and adjust the predetermined sub-pixel offset based upon the feedback. In such an example, the feedback may additionally or alternatively comprise user input indicating an incorrect gaze determination. Any or all of the above-described examples may be combined in any suitable manner in various implementations.

Another example provides, on a computing device, a method of determining a sub-pixel offset for use in computer-implemented gaze tracking to reduce an error rate of user interface interactions using the gaze tracking, the method comprising acquiring a training data set comprising a plurality of eye image frame and corresponding ground truth location pairs, each eye image data frame comprising image data capturing a human eye while a gaze target was displayed on a display at the corresponding ground truth location, for each pair, performing an error analysis by, determining a center of a lens of an eye captured in the eye image data frame, determining a sub-pixel offset to apply to the determined center of the lens via a model comprising a set of one or more weighting factors, applying the sub-pixel offset to the determined center of the lens of the eye to determine an adjusted lens center, determining a gaze direction using the adjusted lens center, and determining an error in the gaze direction after applying the sub-pixel offset based upon the ground truth location for that pair, adjusting the one or more weighting factors to produce an adjusted model, and repeating the error analysis for the adjusted model, determining a selected set of the one or more weighting factors that produces a lowest determined error in the gaze direction, determining a selected sub-pixel offset corresponding to the selected set of the one or more weighting factors, and providing the selected sub-pixel offset for use in gaze tracking. In such an example, the model may additionally or alternatively be a first model and the set of one or more weighting factors may additionally or alternatively be a first set of weighting factors, the method may additionally or alternatively further comprise performing the error analysis on a second model having a second set of one or more weighting factors. In such an example, the method may additionally or alternatively further comprise determining the selected sub-pixel offset based upon whether the first model or the second model produced a lower determined error in the gaze direction. In such an example, determining a sub-pixel offset to apply may additionally or alternatively comprise determining a most probable sub-pixel offset for the model for the pair of image frame and corresponding ground truth pair. In such an example, determining an error in the gaze direction after applying the sub-pixel offset may additionally or alternatively comprise determining a difference between the gaze direction and the ground truth for that pair. In such an example, determining the sub-pixel offset may additionally or alternatively comprise performing a dot product of the model and the image data frame. Any or all of the above-described examples may be combined in any suitable manner in various implementations.

Another example provides, on a computing device, a method of determining a gaze direction, the method comprising acquiring an image of the eye via the eye-tracking system, determining a determined location of a center of a lens of the eye from the image of the eye, the determined location being determined on a pixel scale, adjusting the determined location of the center of the lens of the eye on a sub-pixel scale by applying a predetermined sub-pixel offset to the determined location of the center of the lens of the eye to produce an adjusted location of the center of the lens, determining a gaze direction from the adjusted location of the center of the lens, and performing an action based on the gaze direction. In such an example, determining the determined location of the center of the lens may additionally or alternatively comprise determining a boundary of an iris of the eye and determining a center of the iris based upon the boundary of the iris. In such an example, adjusting the determined location of the center of the lens may additionally or alternatively comprise applying the predetermined sub-pixel offset to the center of the iris. In such an example, determining the determined location of the center of the lens of the eye may additionally or alternatively comprise determining a boundary of a pupil of the eye and determining a center of the pupil based upon the boundary of the pupil. In such an example, adjusting the determined location of the center of the lens may additionally or alternatively comprise applying the predetermined sub-pixel offset to the center of the pupil. In such an example, the method may additionally or alternatively further comprise receiving feedback regarding error between gaze direction and an intended interaction location on a user interface, and adjusting the predetermined sub-pixel offset based upon the feedback. In such an example, the feedback may additionally or alternatively comprise user input indicating an incorrect gaze determination. Any or all of the above-described examples may be combined in any suitable manner in various implementations.

The invention claimed is:

1. A computing device, comprising:
an eye-tracking system comprising an image sensor;
a logic device; and
a storage device comprising instructions executable by the logic device to tracking an eye gaze direction by
acquiring an image of the eye via the eye-tracking system,
determining a determined location of a center of a lens of the eye from the image of the eye, the location being determined on a pixel scale,
after determining the determined location of the center of the lens on a pixel scale, adjusting the determined location of the center of the lens of the eye on a sub-pixel scale by applying a predetermined sub-pixel offset to the determined location of the center of the lens of the eye to produce an adjusted location of the center of the lens, the predetermined sub-pixel offset being based on a machine-trained model for determining a most probable sub-pixel offset;
determining a gaze direction from the adjusted location of the center of the lens; and
performing an action on a computing device based on the gaze direction.

2. The computing device of claim 1, wherein the image sensor comprises a visible light camera, and wherein the instructions are executable to determine the determined location of the center of the lens by determining a boundary of an iris of the eye and determining a center of the iris based upon the boundary of the iris.

3. The computing device of claim 2, wherein the instructions are further executable to apply the sub-pixel offset to the determined center of the iris.

4. The computing device of claim 1, wherein the image sensor comprises an infrared camera, and wherein the instructions are executable to determine the determined location of the center of the lens of the eye by determining a boundary of a pupil of the eye and determining a center of the pupil based upon the boundary of the pupil.

5. The computing device of claim 4, wherein the instructions are further executable to apply the sub-pixel offset to the determined center of the pupil.

6. The computing device of claim 1, the instructions further executable to receive feedback regarding error between gaze direction and an intended interaction location on a user interface, and adjust the predetermined sub-pixel offset based upon the feedback.

7. The computing device of claim 6, wherein the feedback comprises user input indicating an incorrect gaze determination.

8. On a computing device, a method of determining a gaze direction, the method comprising:
acquiring an image of the eye via the eye-tracking system,
determining a determined location of a center of a lens of the eye from the image of the eye, the determined location being determined on a pixel scale,
after determining the determined location of the center of the lens on a pixel scale, adjusting the determined location of the center of the lens of the eye on a sub-pixel scale by applying a predetermined sub-pixel offset to the determined location of the center of the lens of the eye to produce an adjusted location of the center of the lens, the predetermined sub-pixel offset being based on a machine-trained model for determining a most probable sub-pixel offset;
determining a gaze direction from the adjusted location of the center of the lens; and
performing an action based on the gaze direction.

9. The method of claim 8, wherein determining the determined location of the center of the lens comprises determining a boundary of an iris of the eye and determining a center of the iris based upon the boundary of the iris.

10. The method of claim 9, wherein adjusting the determined location of the center of the lens comprises applying the predetermined sub-pixel offset to the center of the iris.

11. The method of claim 8, wherein determining the determined location of the center of the lens of the eye comprises determining a boundary of a pupil of the eye and determining a center of the pupil based upon the boundary of the pupil.

12. The method of claim 11, wherein adjusting the determined location of the center of the lens comprises applying the predetermined sub-pixel offset to the center of the pupil.

13. The method of claim 8, further comprising receiving feedback regarding error between gaze direction and an intended interaction location on a user interface, and adjusting the predetermined sub-pixel offset based upon the feedback.

14. The method of claim 13, wherein the feedback comprises user input indicating an incorrect gaze determination.

* * * * *